United States Patent [19]

Beyer

[11] Patent Number: 5,755,836
[45] Date of Patent: May 26, 1998

[54] PROCESS FOR MANUFACTURING A COMPOSITE FIRE LOG AND PRODUCT RESULTING THEREFROM

[75] Inventor: Curtis D. Beyer, Tucson, Ariz.

[73] Assignee: Earth Cycle, L.L.C., Tucson, Ariz.

[21] Appl. No.: 783,606

[22] Filed: Jan. 14, 1997

[51] Int. Cl.$^6$ ........................................... C10L 5/06
[52] U.S. Cl. ........................ 44/535; 44/589; 44/590
[58] Field of Search ........................ 44/535, 589, 590

[56] References Cited

U.S. PATENT DOCUMENTS

| | | | |
|---|---|---|---|
| 2,015,964 | 10/1935 | Randall | 44/41 |
| 2,531,828 | 11/1950 | Schultz | 158/96 |
| 3,028,228 | 4/1962 | Chaplin | 44/14 |
| 3,227,530 | 1/1966 | Levelton | 44/1 |
| 3,852,046 | 12/1974 | Brown | 44/535 |
| 3,947,255 | 3/1976 | Hartman et al. | 44/590 |
| 4,062,655 | 12/1977 | Brockbank | 44/6 |
| 4,243,393 | 1/1981 | Christian | 44/14 |
| 4,478,601 | 10/1984 | Stephens | 44/14 |
| 4,589,887 | 5/1986 | Aunsholt | 44/16 |
| 4,952,216 | 8/1990 | Good | 44/535 |
| 5,342,418 | 8/1994 | Jesse | 44/589 |

Primary Examiner—Jacqueline V. Howard
Attorney, Agent, or Firm—Antonio R. Durando

[57] ABSTRACT

A combustible article consists of agglomerated wood chips and polyethylene/polypropylene material partially coated with paraffin. The polyethylene/polypropylene material acts as a fuel as well as a binder; the paraffin is provided to facilitate lighting. The composite fire log is produced by combining wood and polyethylene/polypropylene chips or shavings in a mixer; mixing to produce a substantially uniform aggregate and heating to a temperature below the melting point of the polyethylene/polypropylene material; pressing the hot mixture in a press to form a briquette or fire log of predetermined shape; and dipping the bottom of the resulting log in molten paraffin.

19 Claims, 2 Drawing Sheets

PROCESS FOR MANUFACTURING A COMPOSITE FIRE LOG AND PRODUCT RESULTING THEREFROM

BACKGROUND OF THE INVENTION

1. Field of the Invention

This invention is related in general to fire logs and, in particular, to a process for manufacturing an aggregate log from particulates of recyclable materials.

2. Description of the Prior Art

Many commercial fireplace products consist of composites of combustible materials aggregated into fire logs with binders and other additives to improve their burning characteristics. Several prior inventions have included recyclable material in the combustible composition. For example, U.S. Pat. No. 4,478,601 to Stephens discloses a coal briquette consisting of coal mine particulates mixed with minor clumps of fibrous wicking material, a liquid hydrocarbon and methyl cellulose. In one embodiment of the invention, synthetic polyethylene and polypropylene fibers with capillary properties are added to the briquette in spaced-apart clumps to improve its initial burn. The briquette is extruded into a fuel block in a shape designed to produce burning from inside out with minimal smoke release.

U.S. Pat. No. 4,243,393 to Christian describes a fire log manufactured by extruding a mixture of coal particles and a binder. The log features a hollow core that is at least partially filled with an easily burnable igniter. Optionally, the log is also dipped in hot wax to facilitate ignition.

In U.S. Pat. No. 4,589,887, Aunsholt discloses a briquette formed from biomass material mixed with a fly ash binder. The briquettes are prepared by extrusion at about 70–110 Kg/cm$^2$, preferably after preheating to a temperature of about 50°–70° C.

U.S. Pat. No. 2,531,828 to Schultz teaches a coated fuel-impregnated block that consists of a liquid fuel absorbed into fibrous material. The briquette is formed by compressing the absorbent fibrous material, soaking the resulting block in a liquid fuel, and then immersing the block in a solution adapted to form an impervious coating to retain the fuel.

Several other patents (U.S. Pat. Nos. 2,015,964, 3,028,228, 3,227,530, and 4,062,655) disclose additional process features and compositions for improving the performance of fire logs in a fireplace. In view of the ever-increasing problem of disposal of waste materials, the possibility of utilizing any recyclable matter in a fire log is both alluring and sensible. Therefore, some of these prior-art processes have combined recycled components to conventional fossil fuels to produce a combustible briquette.

Plastic items returned by individual users to recycling centers in neighborhood programs throughout the country constitute one of the largest sources of raw material from recycled matter. A plastic number coding is utilized to separate categories of plastic according to their chemical composition, properties, and recyclability. A large portion of these recycled items consists of high and low density polyethylene (milk/water jugs, detergent bottles, margarine tubs, bags, yogurt containers) classified with Codes 2 and 4, for which there are limited recycling opportunities. Similarly, many items consist of polypropylene (prescription bottles, plastic lids) classified with Code 5, for which there are more current recycle uses but are still discarded in large quantities.

Accordingly, there is still a need for new ways of utilizing recycled high and low density polyethylene and polypropylene. This disclosure is directed at a process for utilizing such plastic matter as a major component of fireplace briquettes or logs.

BRIEF SUMMARY OF THE INVENTION

One objective of this invention is a process for making fire logs utilizing large quantities of recycled high and low density polyethylene and polypropylene.

Another goal of the invention is a method of manufacture of fire logs that is primarily based on the utilization of recycled material.

Still another goal is a process with low energy requirements based on conventional steps and directed at producing a hot-burning, low-ash, nearly smoke-free, clean, and efficient fire log.

A final objective is a process that can be implemented easily and economically with commercially available materials and manufacturing equipment, modified only to the extent necessary to fit the requirements of the invention.

Therefore, according to these and other objectives, the present invention consists of an agglomerate of wood chips and polyethylene and/or polypropylene material partially coated with paraffin. The plastic material acts as a fuel as well as a binder; the paraffin is provided to facilitate lighting, if necessary. The composite fire log is produced by combining wood and polyethylene/polypropylene chips or shavings in a mixer; mixing to produce a substantially uniform aggregate and heating to a temperature below the melting point of the polyethylene/polypropylene material; pressing the hot mixture in a press to form a briquette or fire log of predetermined shape; and dipping the bottom of the resulting log in molten paraffin.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

This invention is based on the discovery that polyethylene/polypropylene material uniformly mixed and bonded to wood particles produces a composite briquette that burns at very high temperature with little production of smoke and ashes. Contrary to my expectation based on the common perception that all plastics burn producing unpleasant, apparently toxic, pungent fumes, and that, therefore, they would not be acceptable as fuels, I discovered that the process and composition of the invention produce fire logs with exceptional burn characteristics that enable the commercial production of fire logs from recycled polyethylenes and polypropylenes. Based on these results, I developed a product that can be readily produced entirely from waste materials that have limited other use.

For simplicity, the disclosure below is often presented in terms of polyethylenes only, but it is understood to be equally applicable to polypropylenes and to mixtures of the two. Similarly, the disclosed process temperature ranges were determined to apply to both plastic components and to mixtures of the two. It is noted that both types of plastic materials are available in numerous forms with different melting points and other physical characteristics.

Plant-fiber combustible material and polyethylene/polypropylene are the only two components critical to the composition of the invention. Sources of plant fiber can be wood from agricultural waste, byproducts from lumber mills and other manufacturing operations; nutshells, fruit pits, grains, straw, and grasses; preferably all recycled from waste and byproduct sources. Although this disclosure for the most part refers to wood, it is understood that all such references are intended to include all waste and byproduct materials that contain combustible plant fiber.

Figure 1:
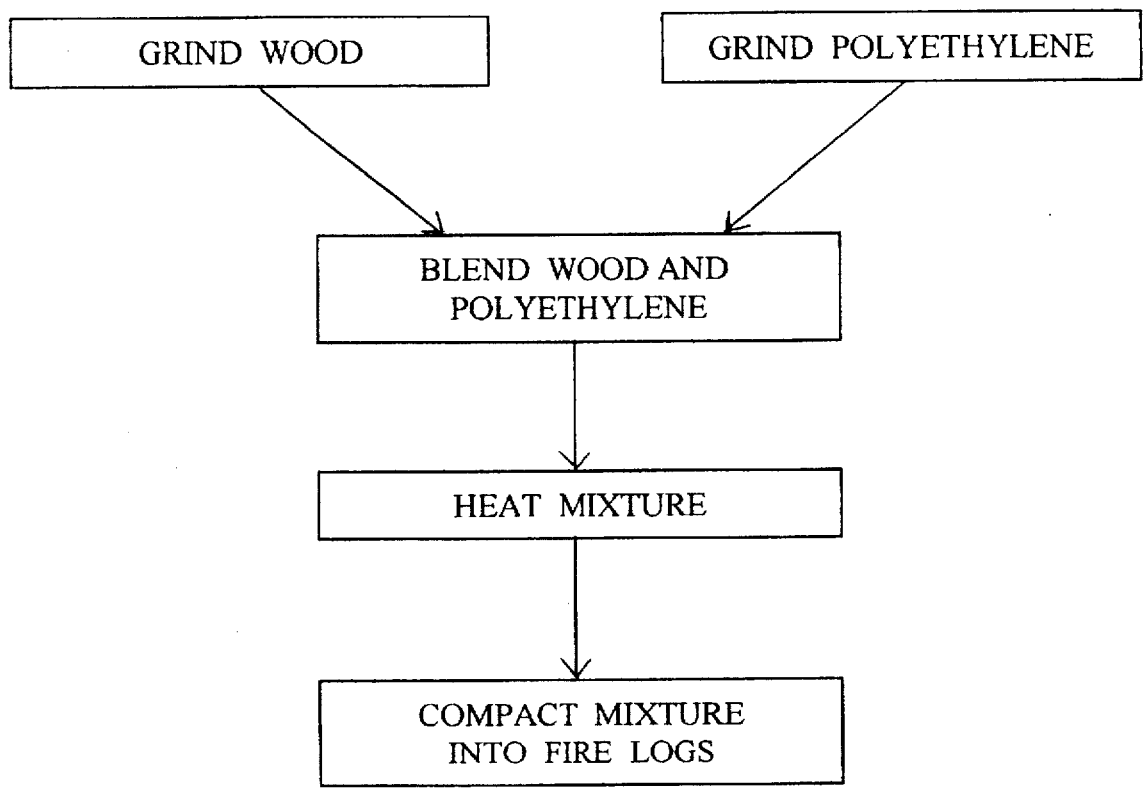
FIG. 1 is a schematic representation of the steps involved in the process of the invention.

As illustrated schematically in FIG. 1, the process of the invention involves a step of reducing the wood or other source of carbon (plant fiber) to chips having a mean particle size of 1 to 50 mm in diameter (that is, they pass through a 50-mm screen), 20–25 mm being preferred. It is noted that smaller and larger particles, such as sawdust and wood chunks, are suitable for the invention but not preferred because of their poorer burn characteristics. I found that a conventional grinder such as the Maxigrind 425G manufactured by Rexworks of Milwaukee, Wis., is suitable for grinding any mixture of these carbon-bearing materials to the desired size.

The recycled polyethylene/polypropylene material is similarly reduced to chips or shavings sufficiently small to allow its rapid blending with the wood material to produce a substantially uniform aggregate. A granulator such as marketed by Polymer Systems Inc. of Berlin, Conn., as Model 68-912-1116-1120, is suitable for reducing the polyethylene/polypropylene ma to an acceptable size. The idea is to use small enough particles to distribute the polyethylene/polypropylene material in the mixture so as to have great surface contact with the wood particles and maximize the bonding strength of the aggregate. Particles ground to about 1–5 mm in effective diameter (that is, ground to pass through a 1- to 5-mm screen) are optimal for mixing. The ground wood and polyethylene/polypropylene particles are mixed in conventional equipment, such as plaster or cement mixers, to yield a uniformly distributed mixture.

The uniform blend of wood and polyethylene/polypropylene particles is then heated to a temperature below the flash point of the mixture, which I found to ignite or at least begin smoldering at temperatures below the melting point of the polyethylene (or polypropylene) at one atmospheric pressure. The idea of the invention is to form a stable aggregate by forcing the polyethylene/polypropylene into voids in the wood fiber by applying sufficient pressure to fluidize the polyethylene/polypropylene at a temperature below the flash point of the mixture. Thus, the exact temperature depends on the operating pressure and the exact composition of the mixture. Typically, a temperature range between 150° C. and 200° C. at about 215 Kg/cm² (an average temperature at which such mixtures begin smoldering at that pressure) is safe for any wood-source and polyethylene blend, about 160° C. being preferred. The heating operation is continued until all plastic material has reached the desired temperature and begun to bond to the surface of wood particles. This step of the operation can be carried out in a standard heated mixer or any arrangement suitable for preparing the mixture for further processing in a press. For example, I heated the mixture with a hot-air blower while the mixture was being transported on a conveyor to an auger feeding the press. I found that a mixture based on 10 to 50 percent by weight of polyethylene/polypropylene (and, correspondingly, on 50–90 wt % of wood) produces a structurally solid composite without the use of any binders. This is an advantage of the present invention with respect to prior-art compositions.

In an alternative method for mixing the wood with the polyethylene/polypropylene material (particularly suitable for polyethylene film), the wood particles are heated separately in the mixer, such as by a hot air flow, and then combined in the mixer with fluidized polyethylene. This approach is particularly appropriate with low density polyethylene (recycle Code 4) because that material, being mostly in the form of thin films, is difficult to grind into discrete particles. In addition, the lower melting point and ductility of low density polyethylenes makes it possible to stretch it and blend it even at atmospheric pressure within the temperature range of operation of the invention. The separately-heated materials are thus mixed thoroughly to produce a uniform blend suitable for compaction into a briquette. Typically, a mixing time of a few minutes is adequate to fully blend the two components. This approach is illustrated in the diagram of FIG. 2.

Figure 2:
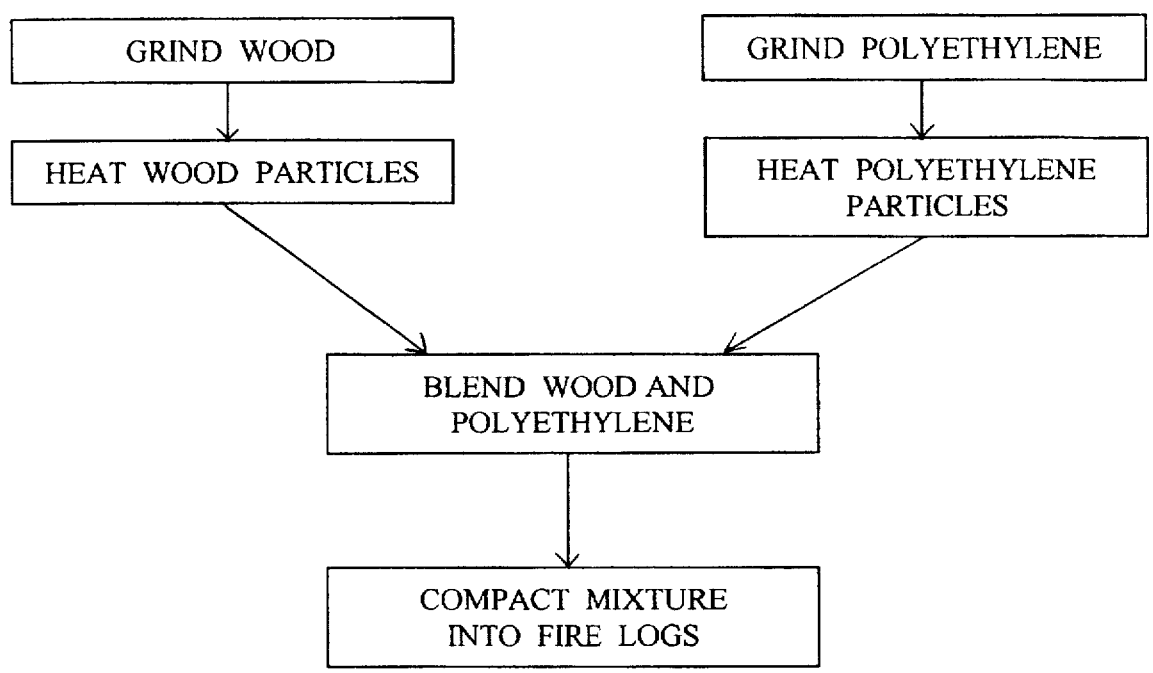
FIG. 2 is a schematic representation of the steps involved in an alternative process of the invention.

If heavier polyethylenes or polypropylenes are used, the step of heating the plastic particles in the process of FIG. 2 can advantageously be carried out in an extruder under pressure where the relative absence of air in the extruder makes it possible to heat the plastic material to temperatures as high as 230° C. without flashing. The balance of the process is then carried out by blending the extruded plastic and the heated wood as described above.

The hot mixture so obtained is then processed in a conventional briquette press to concretely bond the particles of the mixture and, at the same time, to produce fire logs. This compaction step is carried out at a pressure of about 2,800 to 3,500 pounds per square inch (about 200 to 250 Kg/cm²). At these high pressures the hot polyethylene/polypropylene is partially fluidized and forced to permeate or penetrate into voids in the wood fibers and the high level of compaction (typically the volume of the aggregate is halved in the press) produces a uniformly bonded composite that requires no other binding agent. The exact compaction pressure is selected with a view to producing a concrete and stable aggregate with sufficient porosity to sustain burning throughout the log. For a mixture containing about 83 weight percent wood fiber, a pressure of about 3,000 psi (approximately 215 Kg/cm²) is optimal.

Ventilation holes are preferably formed in the logs during the compaction step or drilled into them at a later time. Finally, in order to facilitate the initial ignition of the log, its lower portion can be immersed in liquid paraffin (which is also available as recycled material) or other wax with a low ignition temperature and be allowed to absorb a sufficient amount to produce a self-sustaining flame. I found that 2 to 16 ounces of paraffin (preferably 4 ounces) distributed over an outer layer are adequate for a 12-lb mass of aggregate shaped into a log approximately 16 inches long, 6 inches wide and 6 inches high.

The resulting log burns longer and hotter than a comparable wood log. It produces approximately 11,000 Btu/lb, which is comparable to bituminous fuels. By contrast, though, the logs of my invention leave no unburned chunks, which are typical of wood and coal; rather, they produce only powder ashes. The logs do not produce sparks and burn well mixed with other fuels, such as firewood or coal.

Moreover, the logs of the invention have been measured to produce less than 25% of the particulate matter (smoke), carbon monoxide, polycyclic aromatic hydrocarbons, and formaldehyde emitted by firewood. Although the reasons for this improvement are not specifically understood, I believe that they derive from the relatively higher flame temperature that the wood/polyethylene composites produce.

The fire logs of the invention are preferably packaged in cardboard boxes for ease of handling, storage and transportation. Because of the ease of ignition provided by the paraffin layer, the logs can be burned without first removing them from their box, which greatly facilitates the process of using them in a fireplace.

Thus, one advantage of this invention is the simplicity of the process through which an efficient, hot-burning fire log is manufactured utilizing primarily recycled materials. By applying sufficient pressure to the mixture in the press to achieve partial permeation of the polyethylene/polypropylene material into the wood fiber at safe temperatures (below the flash point of the mixture), no binders or other additives are required to yield an acceptably strong composite. Instead, because of the process by which the logs are manufactured, one of the fuel components itself (polyethylene/polypropylene) provides the necessary binding. Another advantage of the invention is derived from the unexpected burning characteristics of the wood/polyethylene mixture, which provide an efficient and environmentally sound source of fuel.

The following examples illustrate the process and product of the invention.

EXAMPLE 1

A batch of about 130 pounds of scrap wood pieces were ground to less then 25-mm particles. A batch of about 27 pounds of recycled polyethylene (mostly from water and milk bottles) was ground into particles smaller than 5 mm. The two batches were mixed in a plaster mixer (83 wt % wood, 17 wt % polyethylene) for about one minute to produce a substantially uniform blend. The composite mixture was then heated to approximately 160 degrees centigrade with hot air and fed to a press through an auger. The press was operated at approximately 215 Kg/cm$^2$ to form a fire log. The bottom portion of the log was then dipped in molten paraffin.

EXAMPLE 2

A 140-lb batch of a mixture of scrap wood pieces and nutshells (60% wood/40% nutshell weight ratio) were ground to less then 25-mm particles. A 30-lb batch of recycled polyethylene (mostly from water and milk bottles) was ground into particles smaller than 5 mm. The two batches were mixed (82 wt % wood/nutshell, 18 wt % polyethylene) in a plaster mixer for about one minute to produce a substantially uniform blend. The composite mixture was then heated to approximately 160 degrees centigrade with hot air and fed to a press through an auger. The press was operated at approximately 230 Kg/cm$^2$ to form a fire log. The bottom portion of the log was then dipped in molten paraffin.

EXAMPLE 3

About 140 lbs of a sawdust were mixed with a 30-lb batch of recycled polyethylene (mostly from water and milk bottles) in particles smaller than 5 mm. The two batches components were mixed (82 wt % sawdust, 18 wt % polyethylene) in a plaster mixer for about one minute to produce a substantially uniform blend. The composite mixture was then heated to approximately 160 degrees centigrade with hot air and fed to a press through an auger. The press was operated at approximately 230 Kg/cm$^2$ to form a fire log. The bottom portion of the log was then dipped in molten paraffin. Vertical ventilation holes were drilled in the log.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A process for making a combustible article comprising the following steps:
   (a) mixing plant-fiber particles and polyethylene and/or polypropylene particles to form a substantially uniform mixture;
   (b) heating said mixture to a temperature below a flash point of the mixture; and
   (c) pressing the hot mixture resulting from step (b) in a briquette press at a pressure between 200 and 250 Kg/cm$^2$ as required to cause penetration of the polyethylene and/or polypropylene into voids of the plant-fiber particles.

2. The process recited in claim 1, wherein the plant-fiber particles in step (a) are mixed in a concentration of between approximately 50 and 90 weight percent of total composition, and the polyethylene and/or polypropylene particles in a concentration of between approximately 10 and 50 weight percent of total composition.

3. The process recited in claim 1, wherein said plant-fiber particles comprise material selected from the group consisting of wood, nutshells, fruit pits, grains, straw, grass, and mixtures thereof.

4. The process recited in claim 1, wherein said plant-fiber particles are sized to pass through a 50-mm screen.

5. The process recited in claim 1, wherein said polyethylene and/or polypropylene particles are sized to pass through a 5-mm screen.

6. The process recited in claim 1, wherein said mixture is heated to a temperature between 150° C. and 200° C.

7. The process recited in claim 1, wherein said plant-fiber particles comprise material selected from the group consisting of wood, nutshells, fruit pits, grains, straw, grass, and mixtures thereof; said plant-fiber particles are sized to pass through a 50-mm screen and said polyethylene and/or polypropylene particles are sized to pass through a 5-mm screen; said mixture is heated to a temperature between 150° C. and 200° C.; and said step (c) is carried out at a pressure of about 215 Kg/cm$^2$.

8. A process for making a combustible article comprising the following steps:
   (a) heating polyethylene and/or polypropylene particles to a temperature below a flash point of the particles;
   (b) heating plant-fiber particles to a temperature below said flash point;

(c) mixing said plant-fiber particles and polyethylene and/or polypropylene particles to form a substantially uniform mixture; and (d) pressing the hot mixture resulting from step (c) in a briquette press at a pressure between 200 and 250 Kg/cm$^2$ as required to cause penetration of the polyethylene and/or polypropylene into voids of the plant-fiber particles.

9. The process recited in claim 1, wherein said step (a) is carried out in an extruder.

10. A combustible article produced according to the method recited in claim 1.

11. A combustible article produced according to the method recited in claim 8.

12. The process recited in claim 8, wherein the plant-fiber particles in step (c) are mixed in a concentration of between approximately 50 and 90 weight percent of total composition, and the polyethylene and/or polypropylene particles in a concentration of between approximately 10 and 50 weight percent of total composition.

13. The process recited in claim 8, wherein said plant-fiber particles comprise material selected from the group consisting of wood, nutshells, fruit pits, grains, straw, grass, and mixtures thereof.

14. The process recited in claim 8, wherein said plant-fiber particles are sized to pass through a 50-mm screen.

15. The process recited in claim 8, wherein said polyethylene and/or polypropylene particles are sized to pass through a 5-mm screen.

16. The process recited in claim 8, wherein said mixture is heated to a temperature between 150° C. and 200° C.

17. The process recited in claim 8, wherein said plant-fiber particles comprise material selected from the group consisting of wood, nutshells, fruit pits, grains, straw, grass, and mixtures thereof; said plant-fiber particles are sized to pass through a 50-mm screen and said polyethylene and/or polypropylene particles are sized to pass through a 5-mm screen; said mixture is heated to a temperature between 150° C. and 200° C.; and said step (d) is carried out at a pressure of about 215 Kg/cm$^2$.

18. A combustible article produced according to the method recited in claim 7.

19. A combustible article produced according to the method recited in claim 17.

* * * * *